July 28, 1964   V. E. GOUGH ET AL   3,142,178
APPARATUS FOR TESTING PNEUMATIC TYRES
Filed Aug. 5, 1960   10 Sheets-Sheet 1
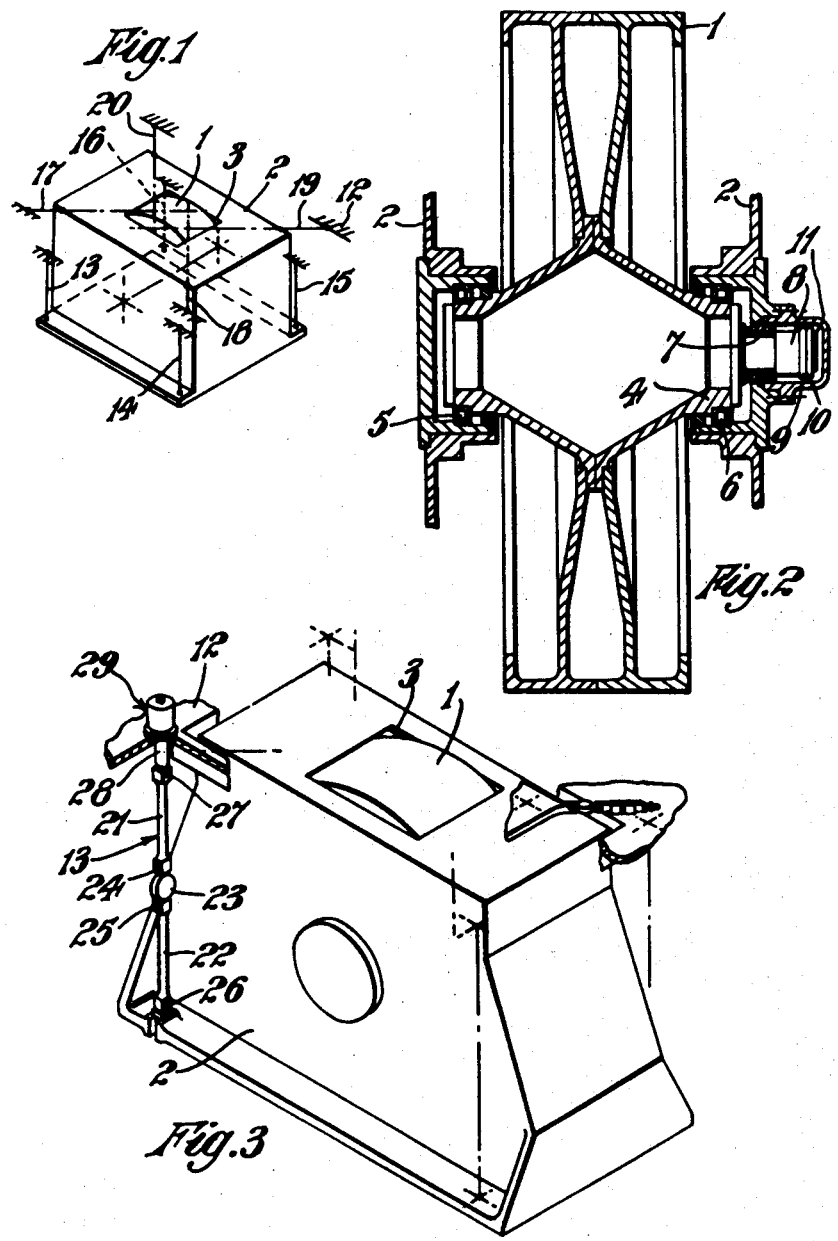
INVENTORS
Vernon Eric Gough
Clifford Ward Barson
by Benj. T. Rauber
attorney

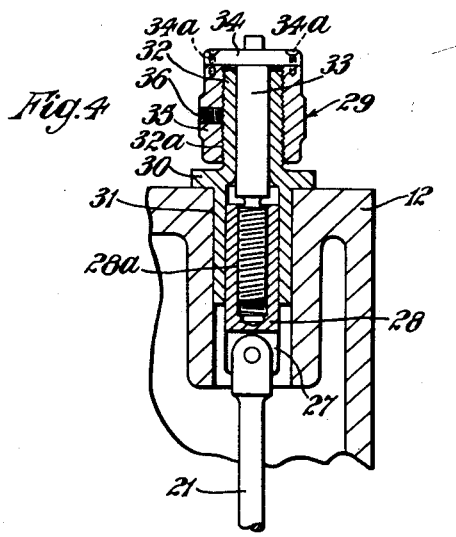
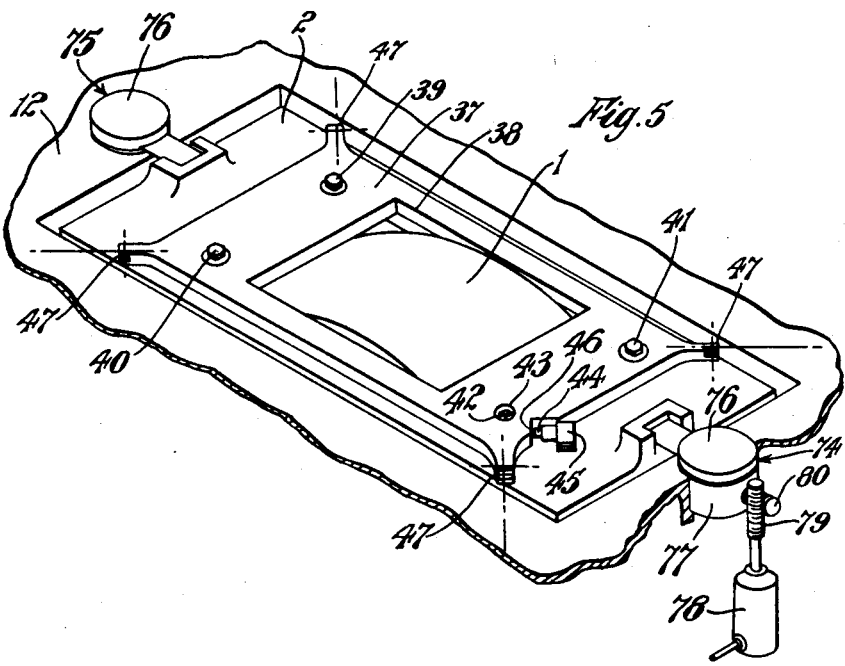

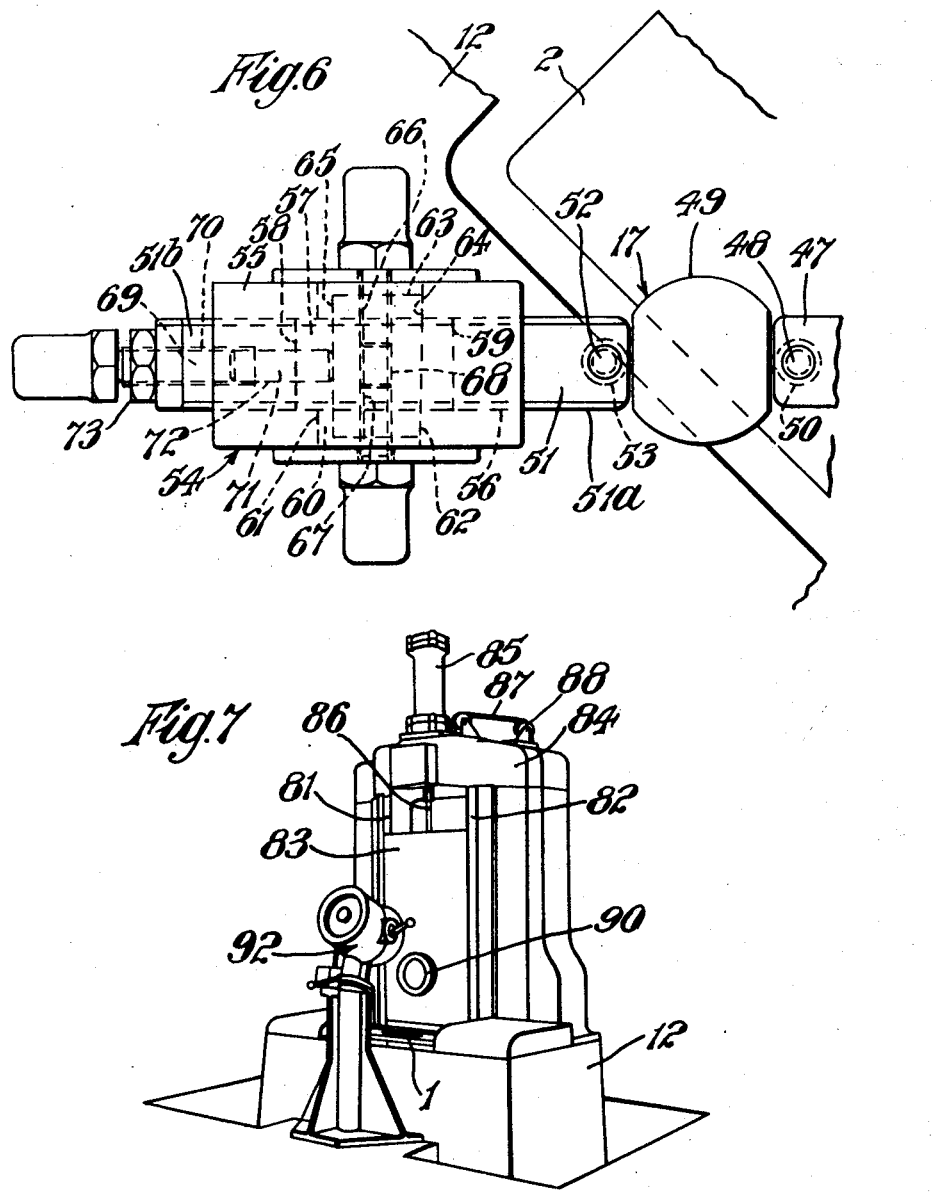

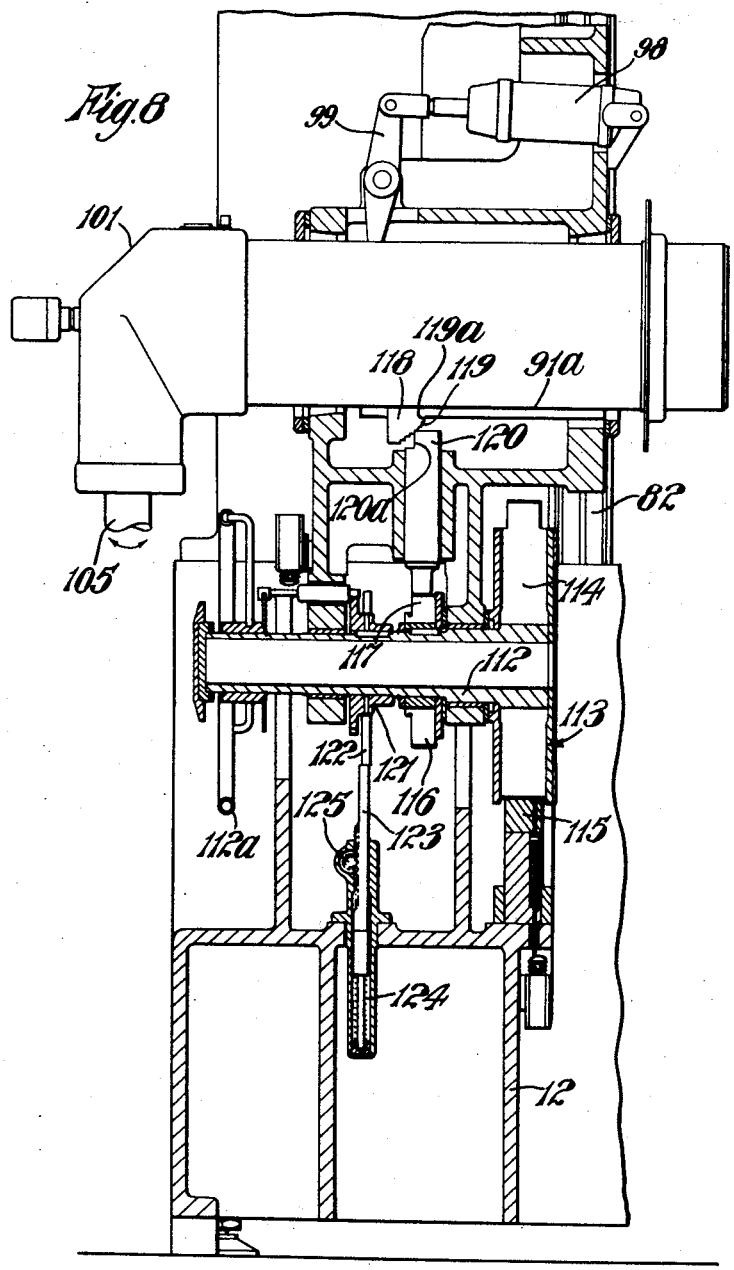

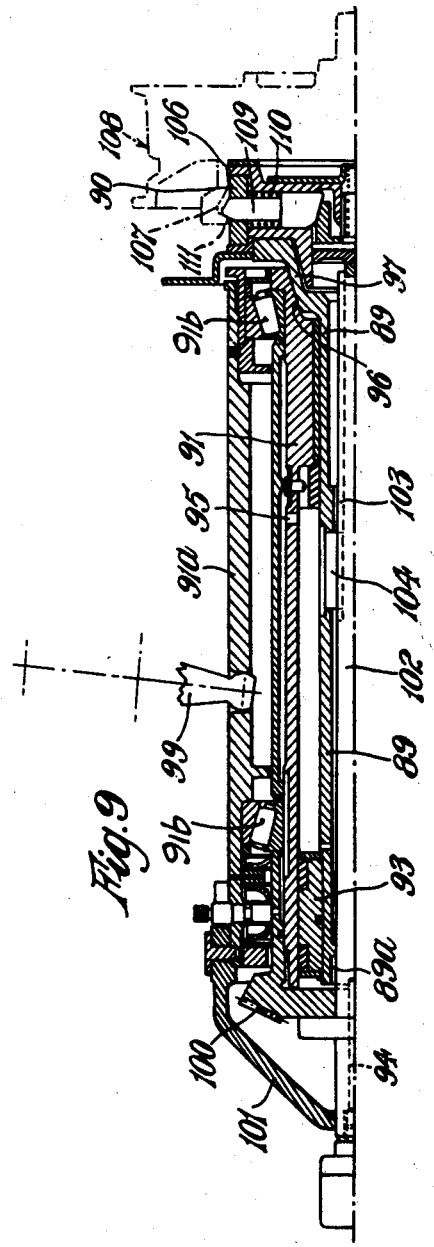

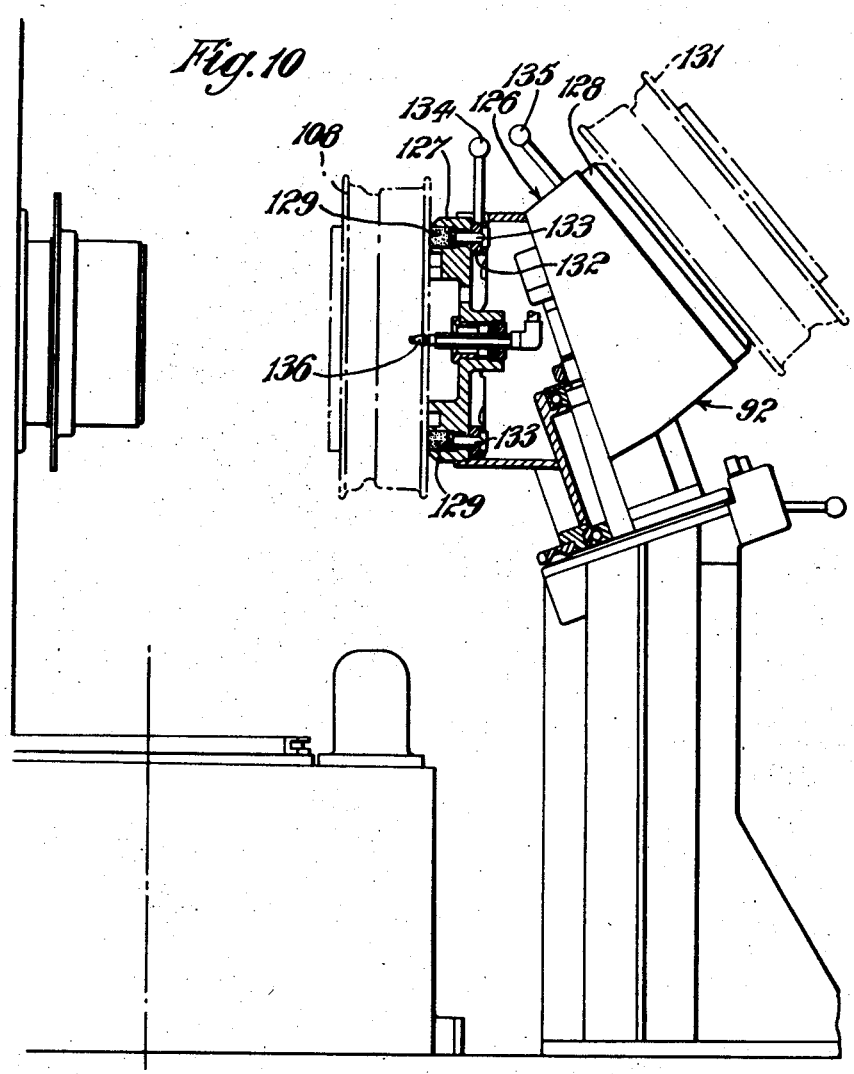

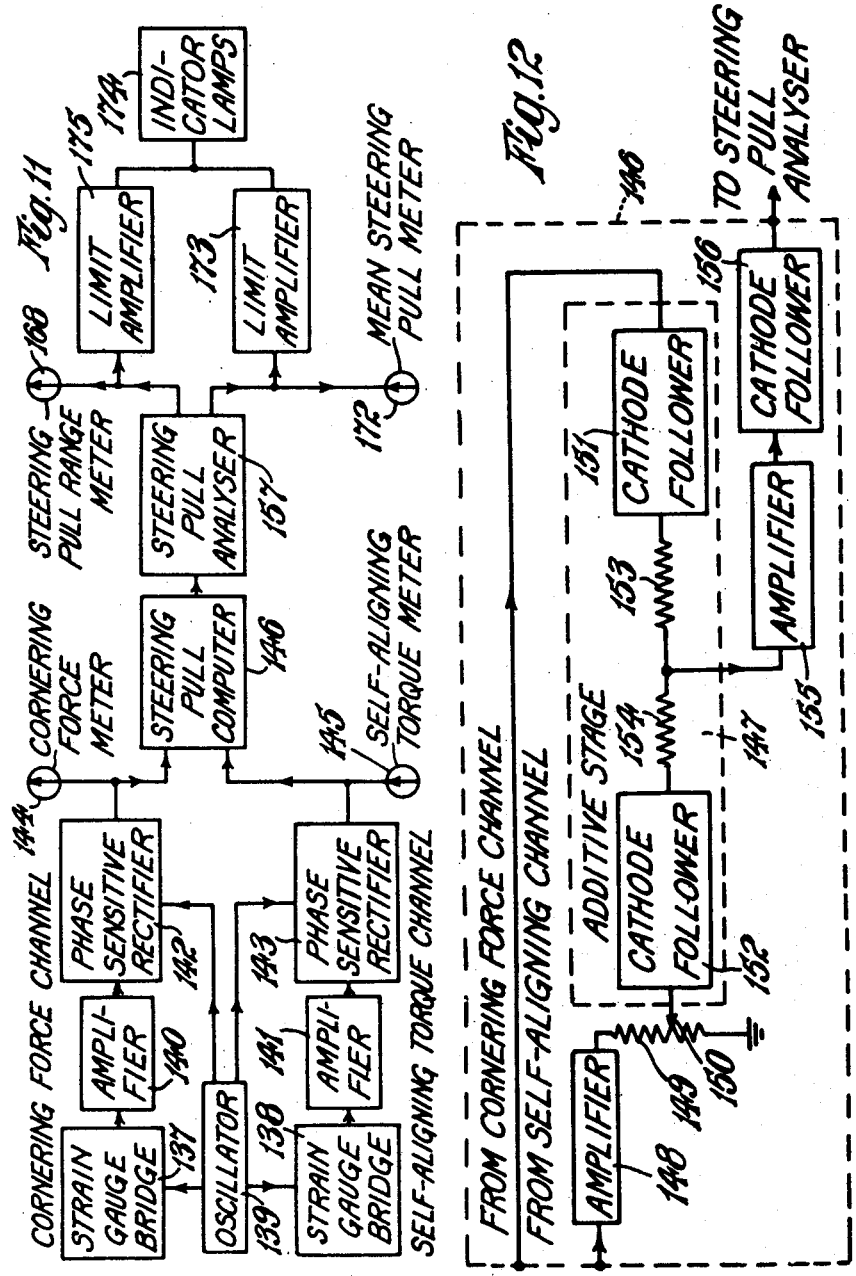

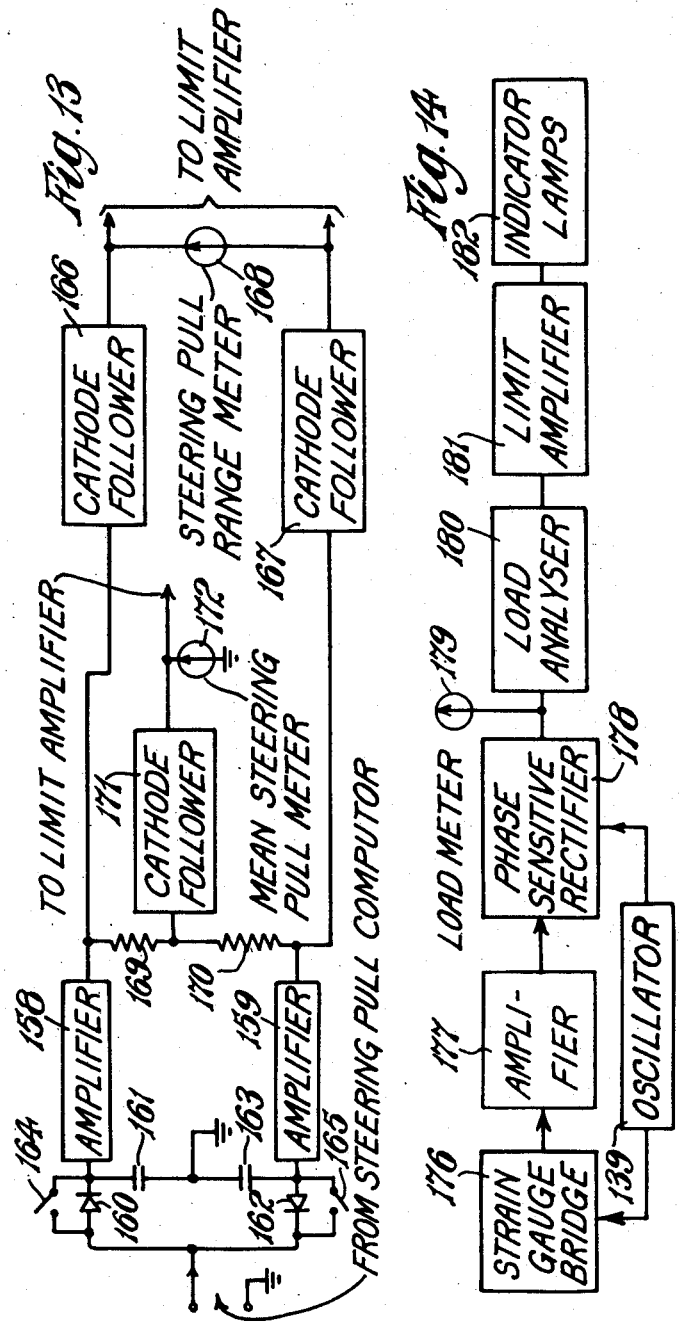

July 28, 1964 V. E. GOUGH ET AL 3,142,178
APPARATUS FOR TESTING PNEUMATIC TYRES
Filed Aug. 5, 1960 10 Sheets-Sheet 9
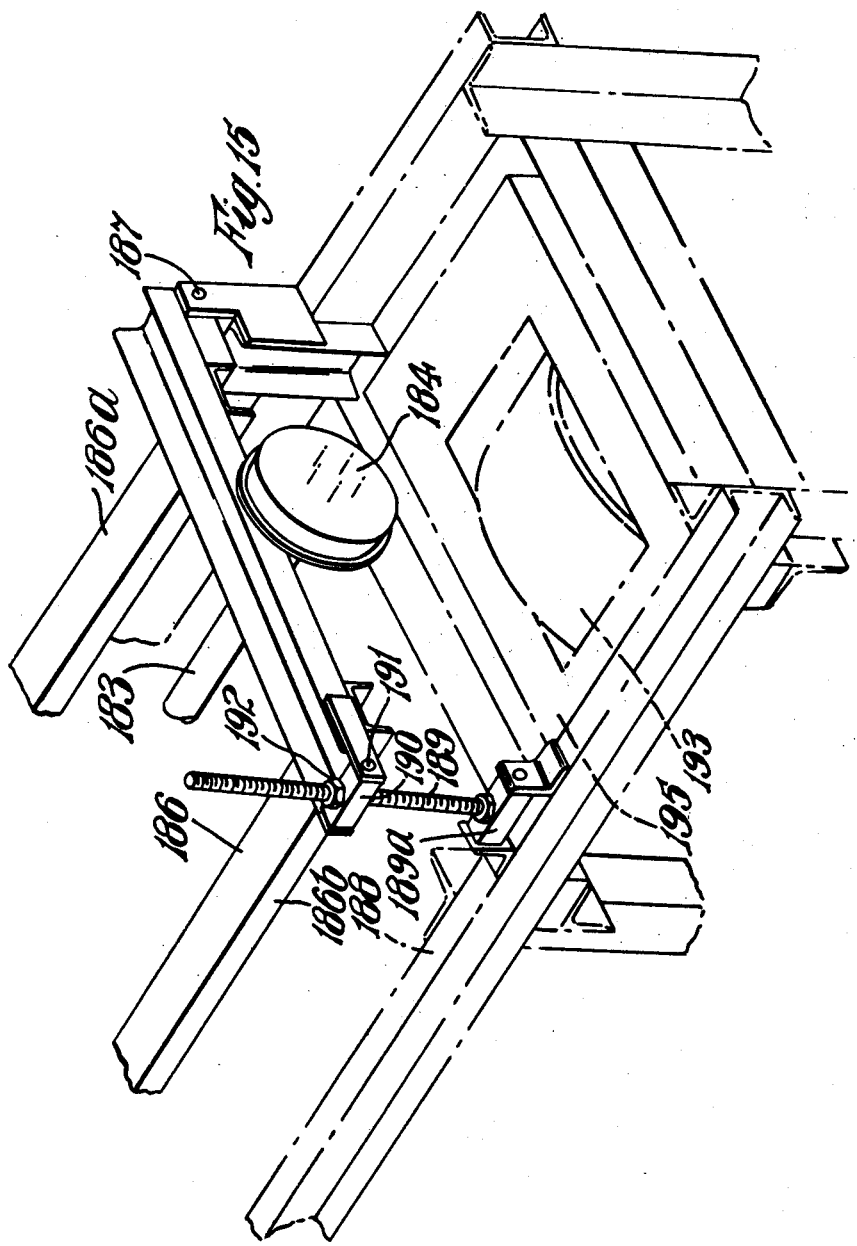
INVENTORS
Vernon Eric Gough
Clifford Ward Barson
by Benj. J. Rauber
attorney United States Patent Office 3,142,178
Patented July 28, 1964

1

3,142,178
APPARATUS FOR TESTING PNEUMATIC TYRES
Vernon Eric Gough, Sutton Coldfield, and Clifford Ward Barson, Knowle, Solihull, England, assignors to Dunlop Rubber Company Limited, a British company
Filed Aug. 5, 1960, Ser. No. 47,634
Claims priority, application Great Britain Aug. 13, 1959
21 Claims. (Cl. 73—146)

This invention relates to apparatus for testing pneumatic tyres.

It is well-known that when a loaded rotating pneumatic tyre is steered through a certain angle, the circumferential plane of symmetry of the undistorted tyre is moved out of alignment with the portion of the tread in contact with the ground with the result that a cornering force is set up between the tyre and the ground. At the same time, the elasticity of the tyre tends to twist the distorted portion of the tread back into alignment, if the steered angle is maintained, with the result that a self-aligning torque is set up. It would be expected that when a vertically loaded and vertically mounted tyre rolls under conditions in which no steered angle is set up there would be no cornering force or self-aligning torque produced.

It has been found, however, that in known tyre constructions incorporating rigid breakers made up, for example, of superposed layers of parallel steel cords the cords in any one layer crossing those in the other layer or layers, a residual cornering force and self-aligning torque is set up when such tyres are vertically mounted, vertically loaded and rolled in a straight line parallel to the circumferential plane of symmetry of the cover along level ground.

The invention provides apparatus for grading tyres according to the magnitude of the residual cornering force and self-aligning torque set up under the above conditions.

According to the invention, apparatus for measuring the cornering force or the self-aligning torque or both set up by a rotating pneumatic tyre comprises a frame, a cylindrical drum, means for rotatably supporting the drum in a substantially fixed position relative to the frame, supporting means for rotatably supporting the tyre mounted on a wheel with its axis substantially parallel to that of the drum and in fixed axial relationship to the frame, means for relatively moving the supporting means and the drum in order to move the tyre and drum into and out of contact with one another and for loading the tyre, driving means for rotating either the supporting means for the tyre or the drum, and means associated with the means for supporting the drum for measuring the cornering force or the self-aligning torque or both set up on the drum by rotation of the tyre in contact with the drum.

Preferably, the means for supporting the drum relative to the frame comprises a system of tension links, the links each having a high stiffness and each link being provided with a strain gauge for measuring the strain set up in the link.

The links for supporting the drum may comprise at least three tension links arranged in the same horizontal plane, their lines of action forming a closed polygon around the area of contact of the tyre and the drum.

Preferably also the drum is mounted on an axle carried by a cradle, the cradle being suspended within the frame by four vertical tension links and four horizontal tension links, each link being attached at one of its ends to the frame and at the other end to the cradle, the horizontal links being arranged symmetrically so that their axes form the sides of a square lying in a horizontal plane perpendicular to the plane containing the axes of rotation of the drum and the wheel and passing through that area of the drum which is contacted by a loaded tyre. The horizontal tension links are preferably arranged so that the axes of the tyre and the drum are both parallel to a diagonal of the square formed by the axes of the horizontal links.

The cradle is preferably made from a light material, e.g. aluminium alloy, and if the frame is of material such as cast iron, having a different thermal expansion coefficient to the cradle it is necessary to connect the horizontal tension links to a plate, of similar thermal properties to the frame, which is fixed to the cradle in such a manner that the plate can expand or contract relative to the cradle without affecting the resultant forces or couples applied to the cradle and the plate.

Means may also be provided for measuring fluctuations in the vertical load applied to the drum by rotation of a tyre about a fixed axis and with its tread in contact with the drum surface. These means may conveniently take the form of strain gauges fixed to the vertical tension links.

The axle for carrying the wheel and tyre may be movable into predetermined axial positions in order to accommodate tyres having different rim widths, and the said axle may be movable to positions at predetermined distances from the drum surface according to the rim diameter and sectional size of the tyre under test.

Two embodiments of the invention will now be described with reference to the accompanying drawings, in which:

FIGURE 1 is a diagrammatic isometric view of a drum and suspension;

FIGURE 2 is a diagrammatic axial cross-sectional view of the drum and part of a cradle;

FIGURE 3 is a similar view to that of FIGURE 1, showing parts of the suspension in more detail;

FIGURE 4 is a diagrammatic cross-sectional view of a differential screw attached to a vertical link;

FIGURE 5 is a diagrammatic isometric view, partly cut-away, of the upper surface of the drum cradle, and a machine frame;

FIGURE 6 is a diagrammatic plan view of a horizontal link and associated tensioning device;

FIGURE 7 is a diagrammatic perspective view of a tyre testing machine and associated supply turret;

FIGURE 8 is a side cross-sectional view of apparatus for supporting and rotating a tyre;

FIGURE 9 is a cross-sectional view of part of the apparatus shown in FIGURE 8;

FIGURE 10 is a side elevation of the tyre supply turret and part of the testing machine, showing two wheels in position on the turret;

FIGURES 11–14 are block schematic circuit diagrams of electronic apparatus associated with the tyre testing machine;

FIGURES 15 and 16 are diagrammatic perspective views of parts of an alternative tyre testing apparatus.

Figure 16:
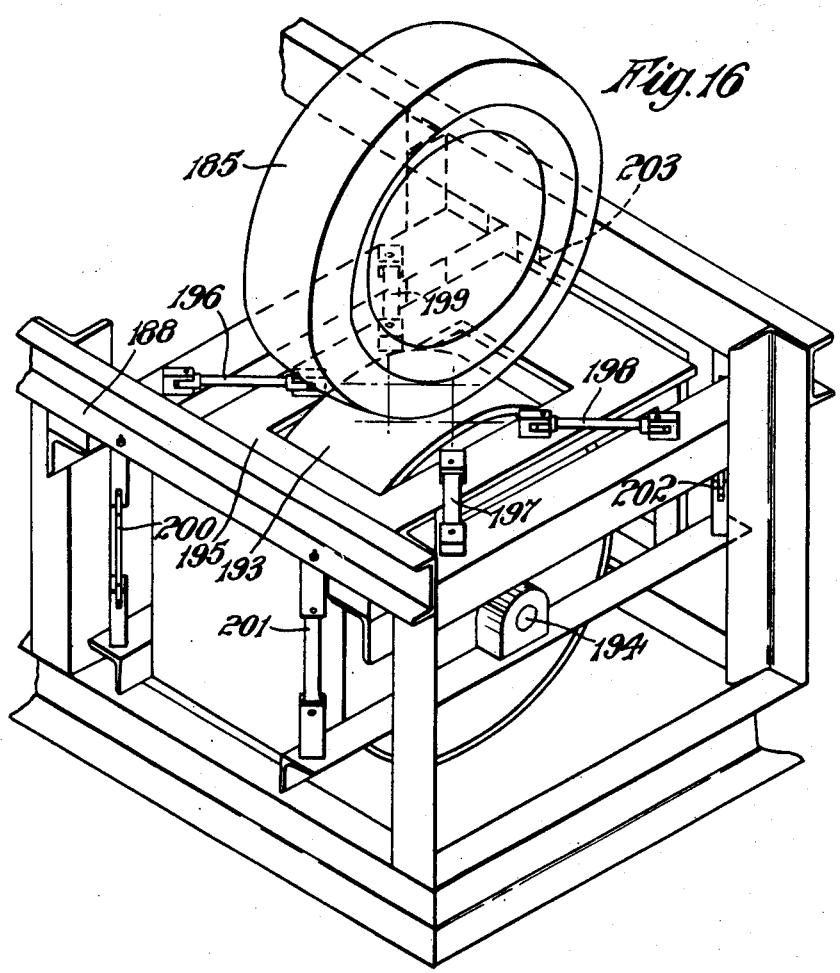

A preferred embodiment of the invention, illustrated in FIGURES 1–14 will now be described.

A light alloy, accurately balanced, cylindrical drum 1 is freely rotatably mounted in a rigid light alloy cradle 2 having an aperture 3 to enable a tyre to be run with its tread in contact with the upper surface of the drum. The drum 1 (see FIGURE 2) is supported within the cradle 2 by a horizontal axle 4 carried in roller bearings 5 and 6 and held in a fixed axial position relative to the cradle by a double thrust ball bearing 7. The bearings 5 and 6 have plain cylindrical outer races to ensure that all axial thrust is taken by the bearing 7, thus ensuring free rotation of the drum about the bearings 5 and 6 and elimination of axial play. The drum is clamped axially to the bearing 7 by means of a collar 8, nut 9, and locknut 10, the nuts 9 and 10 being in screw-threaded engagement with an extension 11 to the drum axle 4.

The cradle 2 is supported within a machine frame 12 by the following means, shown in outline in FIGURE 1:

Four vertically disposed tension links 13, 14, 15 and 16 are attached at one end one to each bottom corner of the cradle 2 and at the other end to the machine frame 12. The links 13–16 are adjusted in length, by means to be described, to set the drum axle horizontal and at a predetermined height relative to the machine frame. The cradle 2 is restrained from lateral movement, and from rotation about a vertical axis, by means of four horizontal tension links 17, 18, 19 and 20 which connect the cradle to the machine frame 12 and which are disposed so that their lines of action (shown by chain-dotted lines in FIGURE 1), form a square symmetrically surrounding the centre of the area of the drum 1 for contacting a tyre under test, one diagonal of said square lying in the vertical plane passing through the drum axis.

The vertical tension links 13–16 are identical to one another, and the link 13 only will be described (see FIGURE 3). The link 13 consists of two fork-ended rods 21 and 22 connected to one another by a ring 23 having lugs 24 and 25 pivotally connected to the ends of the rods. The link 22 is pivotally attached at its lower end to a lug 26 fixed to the cradle, and the link 21 is pivotally attached at its upper end to a lug 27 formed on a hollow cylindrical shaft 28 forming part of a differential screw mechanism 29. The pivots connecting the rods 21 and 22 to the frame 12 and the cradle 2, respectively, are at right angles to the pivots connecting the rods 21 and 22 to the ring 23, to allow the cradle to swing freely in all directions. The ring 23 is provided with wire-wound electrical resistance strain gauges for measuring the tension set up in the link 13 by a vertical load applied to the drum 1.

The differential screw mechanism 29 (see FIGURE 4) comprises a bush 30 fixed in a hole 31 in the machine frame 12 and having a hollow cylindrical portion 32 extending upwardly from the frame 12. A cylindrical rod 33, which is axially slidable and rotatable within the bush 30, is fixed at its upper end to a disc 34 which is secured, by screws 34a, to a sleeve 35 having an internal screw-thread engaged with an external screw-thread 32a on the portion 32. A grub-screw 36 is provided in the sleeve 35 to lock the sleeve to the bush 30. The lower end of the rod 33 is externally screw-threaded and engages an internal screw-thread 28a on the hollow shaft 28. The screw-threads 28a and 32a are of the same hand but of slightly different pitch, so that when the sleeve 35 is rotated the two threads act in opposition to one another, one tending to lower the link 21 and the other to raise it. The resultant effect is equivalent to that which would be obtained by the use of a single adjusting screw of very small pitch, thus enabling the levelling and height of the cradle to be adjusted very accurately. By removing the screws 34a and rotating the disc 34, only the screw-thread 28a is operated, thus enabling coarse adjustments to be made.

The horizontal tension links 17–20 are attached one to each corner of a steel plate 37 (FIG. 5) fixed to the upper surface of the cradle 2 and having an aperture 38 coextensive with the aperture 3. The steel plate 37 (see FIGURE 5) is provided to eliminate the effect of variation in spacing between the cast iron frame 12 and the light-alloy cradle 2, resulting from their unequal thermal expansion coefficients, which would otherwise affect the tension in the horizontal links. The plate 37 is clamped to the cradle by a tightly-fitting bolt 39, two bolts 40 and 41 which pass through clearance holes in the plate 37, and a stud 42 the shank of which is made in the shape of a knife edge which forms an abutment to engage the edge of a clearance hole 43 in the plate 37. The stud 42, which is shown in cross-section in FIGURE 5, has a screw-threaded portion extending above the plate 37 and is provided with a nut and washer (not shown) to prevent vertical movement of the plate 37. A plunger 44 is forced by a spring, contained within a housing 45 fixed to the cradle, against a notch 46 in the edge of the plate 37. The pressure from the plunger 44 tends to turn the plate 37 in the horizontal plane about the bolt 39, and causes the knife edge of the stud 42 to be firmly engaged by the edge of the hole 43. The pressure exerted by the plunger 44 on the plate 37 is arranged to be sufficient to prevent any axial thrust or couple acting on the drum, developed by a tyre during a test, from moving the plate away from the stud 42, whilst permitting thermal expansion of the plate 37 relative to the cradle 2.

Each corner of the plate 37 is provided with a fork 47, and the horizontal tension links 17–20 are pivotally connected to the forks by pins 48 (see FIGURE 6). The lines of action of the horizontal links are arranged to lie in a plane slightly below the upper surface of the drum 1. This is to ensure that the horizontal links act in the same plane as the cornering force, i.e. in a plane approximately mid-way between the horizontal plane tangential to the top of the drum and the horizontal plane cutting the drum at the points where the deflected tyre loses contact with the drum surface. The links 17–20 are identical to one another, and the link 17 only will therefore be described (see FIGURE 6).

The link 17 comprises a ring 49 pivotally connected to the fork 47 by the pin 48, which passes through a lug 50 attached to the ring. The ring 49 is also pivotally connected to the forked end 51a of a shaft 51 by a pin 52 passing through a lug 53 attached to the ring. The ring 49 is provided with two pairs of wire-wound electrical resistance strain gauges, the gauges being arranged on the ring so that one gauge of each pair is placed in tension and one gauge in compression when tension is applied to the ring.

The shaft 51 forms part of a device 54 for adjusting the tension in the link 17 (adjusting devices identical to the device 54 are provided for each of the other links 18–20). The device 54 comprises a block 55 fixed to the machine frame 12 and having a longitudinal groove 56 in which the shaft 51 is slidable. The shaft 51 is provided with a transverse slot 57 having side faces 58 and 59, and the block 55 is provided with a transverse slot 60 having side faces 61 and 62, the face 62 being machined at an angle of 91° to the longitudinal direction of the block. A wedge 63 having a face 64 inclined at 1° to the opposite face 65 and which bears against the face 62 is transversely adjustable within the slots 57 and 60 by means of screws 66 and 67 in engagement with a screw-threaded transverse hole 68 in the wedge.

The shaft 51 is freely slidable longitudinally of the block 55, the wedge 63 being clear of the edges of the slot 57, and tension may be applied to the end 51b of the shaft by means of a screw 69 threaded into a screw-threaded longitudinal hole 70 in the shaft and applying pressure via a plunger 71, slidable within a hole 72, to the face 65 of the wedge. The screw 69, which may be locked in position by a locknut 73, provides a coarse adjustment for the tension set up in the link 17, the transverse movement of the wedge 63 providing a fine adjustment.

The horizontal links 17–20 and vertical links 13–16 are adjusted by the tensioning devices 54 and the differential screw mechanisms 29 so that the drum axis and the upper surface of the cradle are horizontal and at the appropriate height relative to the frame 12 to ensure that the lines of action of the links 17–20 are horizontal. The tensions in the horizontal links are adjusted so that the cradle is centralised in the frame 12 and to create a predetermined tension in each link which exceeds any tension likely to be created as a result of cornering force or self-aligning torque developed during a test.

In order to avoid undue stress being accidentally applied to the tension links during tyre changing operations, the cradle 2 is provided with a pair of magnetic clamps 74 and 75 (see FIGURE 5) to clamp it to the frame 12 when no test is in progress. The clamps 74 and 75 each comprise a soft iron disc 76 fixed to the cradle 2 and a permanent magnet clamping device 77 which can be mechanically actuated by a pneumatic piston and cylinder 78 via a rack 79 and pinion 80 to hold the disc 76 magnetically or to release it.

Vertical guide rails 81, 82 are rigidly attached to the top of the machine frame 12 in a position axially offset with respect to the drum 1 (see FIGURE 7). The rails 81, 82 are provided with V-grooves for engaging corresponding projections (not shown) on a slide 83 carried within the rails, the slide 83 thus being movable vertically between the rails 81, 82. The tops of the rails are connected by a bridge piece 84 on which is mounted a double-acting pneumatic cylinder and piston 85, the piston being connected to the slide 83 by a connecting rod 86. Counterpoise weights (not shown) for the slide 83 are provided and are connected to the slide by means of cables 87 passing over pulleys 88 mounted on the bridge piece 84.

An axle 89 (shown in upper half, longitudinal, section in FIG. 9), provided with a hub 90 for supporting the wheel carrying the tyre under test, is rotatably mounted on the slide 83, parallel to the axis of the drum 1. The axle 89 is axially slidable within a sleeve 91 so that it may, alternatively, be brought out of the sleeve to pick up a wheel and tyre for testing from a supply turret 92 (see FIGURE 7), situated adjacent to the machine frame 12, or retracted to an axial position which may be set by the operator by means to be described. A piston 93 is attached to the end 89a of the axle remote from the hub. The piston 93 is slidable within the sleeve 91, and ducts 94, 95 are provided for applying air pressure to the interior of the sleeve 91 on either side of the piston to advance or retract the axle. The sleeve 91 is provided with a conical seating 96 with which an enlarged correspondingly-shaped portion 97 of the axle 89 adjacent to the wheel hub 90 is engageable to limit the extent to which the axle can be retracted and thus to correctly locate the hub 90, carrying a wheel and tyre, at the testing position. The sleeve 91 is rotatable within an outer sleeve 91a in bearings 91b and the sleeves 91 and 91a are axially movable, together, by means of a pneumatic cylinder and piston 98 and a lever 99 (see FIGURE 8) into various predetermined axial positions, for a purpose to be described later.

A gear 100, one of a pair of meshing spiral bevel gears carried in a housing 101 attached to the sleeve 91, is drivably connected to the axle 89 via a telescopic coupling consisting of a drive shaft 102 having a keyway 103 engaged by a key 104 fixed to the axle 89. The other spiral bevel gear of said pair (not shown) is connected to a motor (not shown) mounted on the base of the machine frame by a second telescopic drive 105 (see FIGURE 8) provided with a pair of universal joints (not shown).

The wheel hub 90 is provided with a cylindrical portion 106 for fitting within a recess 107 in a wheel 108 (shown in chain-dotted lines in FIGURE 9) and three radially disposed wedges 109 are carried within the cylindrical portion, the wedges being movable radially outwardly by pneumatic pressure to grip the sides of the recess 107 in the wheel. The wheel 108 forms the subject-matter of Patent No. 3,063,485 to Bennett and Jenkins, issued Nov. 13, 1962. The wedges 109 are urged inwardly by springs 110 which thus effect the release of the wheel 108 on removal of the pneumatic pressure. The recess is provided with an annular flange 111 to prevent the hub from being withdrawn whilst the wedges are in the expanded state.

The height above the drum 1 at which the axle 89 is required to be set and the required axial position of the axle relative to the drum are dependent on the external diameter of the tyre to be tested and the width and the type of the wheel upon which the tyre to be tested is mounted. In order to enable the operator to adjust the machine quickly for any one of thirty different tyres and wheels to be tested, there is provided a cam shaft 112 (see FIGURE 8), rotatable by a hand-wheel 112a into thirty different angular positions, each position corresponding to a tyre and wheel size. The cam shaft 112 is rotatably attached to the slide 83.

For setting the height of the axle above the drum the cam shaft 112 carries a first cam 113 having a cam surface consisting of thirty radially disposed studs 114, some of which are of different lengths, for contacting a fixed stop 115 on the machine frame 12 and thus physically locating the slide 83 and thus the axle 89 for carrying the tyre and wheel in the appropriate position.

In order to adjust the axial position of the axle, a second cam 116 is provided having a cam surface consisting of thirty radially disposed studs 117, some of which are of different lengths. The outer sleeve 91a has attached to its outer surface a member 118 provided with a series of axially spaced shoulders 119 of gradually increasing radii. A shoulder-engaging plunger 120 is radially slidable relative to the axle 89 in a fixed axial position relative to the slide 83. The plunger 120 is engageable selectively with any one of the shoulders 119. In order to effect engagement, the sleeve 91a and thus the sleeve 91 are moved axially by the piston and cylinder 96 to a position wherein the shoulder of smallest radius 119a is radially aligned with the side 120a of the plunger 120, and the cam shaft 112 is then rotated to the appropriate position wherein the stud 117 provided for that position engages the plunger 120 to set it at a predetermined height. Axial movement of the sleeve 91a in the reverse direction causes the plunger to engage with the particular shoulder 117 which will set the sleeve 91 in the required axial position.

A third cam 121 comprising a set of thirty studs 122, also carried by the cam shaft 112, engages a rack 123 which is spring-loaded into contact with the studs 122 by a spring 124 when the axle is in its operating position. The rack 123 has a pinion 125 which is drivably connected to a multiple potentiometer unit (not shown) which controls an electronic system, which will be described, so that appropriate accept/reject limits are established for different tyre sizes and corresponding positions of the cam shaft 112.

A speed control for the tyre drive motor comprises a rotary potentiometer (not shown) mounted on the frame 12 and operated by the vertical movement of the slide 83 to vary the speed of the motor according to the diameter of the tyre under test to produce a constant peripheral speed during testing for all sizes of tyre.

The supply turret 92 is positioned adjacent to the frame 12. The turret 92 has a rotatable head 126 (see FIGURE 10) which carries two hubs, 127, 128 having axes inclined to one another, the rotational axis of the head bisecting the angle between the hub axes and being inclined so that, in the position shown in FIGURE 10, the axis of the hub 127 is horizontal with the hub 127 facing and coaxial with the hub 90, the hub 128 being inclined and directed away from the machine to facilitate the fitting or removal of a wheel respectively to or from the hub. The head may be rotated to dispose either hub 127 or hub 128 in the position facing the machine.

The turret hubs 127 and 128 each contain permanent magnets 129 for holding wheels 108, 131 respectively in position thereon, the magnets being retractable into the turret head by means of cam rings 132 engaging the heads of bolts 133 attached to the magnets 129, operated by hand levers 134, 135 respectively to release the wheel manually when required. Inflation nozzles 136, only one of which is shown in FIGURE 10, are provided for engagement with corresponding valves fitted to the wheels 108, 131.

The tyre testing operations are automatic and are controlled, from the initiation of a test by the operator, by a conventional electrical timing and sequence controlling system, interlocks being provided to ensure that the apparatus cannot function until it is correctly set up.

The measurements of cornering force, self-aligning torque, and vertical load developed on the drum during a test are converted into electrical voltages, amplified, and a combination of their values is used to operate accept/reject circuits which cause differently coloured lamps to be lit according to whether or not the tyre tested produces forces on the drum 1 which lie within predetermined tolerances. The electrical apparatus provided for this purpose is as follows:

The measurements of cornering force and self-aligning torque are obtained from the two pairs of strain gauges carried by the horizontal tension links 17–20. The gauges are arranged on the rings in the conventional manner so that one gauge of each pair is put in compression and the other gauge in tension when tension is set up in the ring. Cornering force is determined from the algebraic sum of the components of the forces, resolved in an axial direction of the drum, measured by the cornering force gauges. The self-aligning torque is determined from the algebraic sum of the moments of the forces measured by the self-aligning torque gauges about the centre point of the contact area of the tyre and the drum.

Expressed symbolically, if $T_1$, $T_2$, $T_3$, $T_4$ are the tensions set up in the links 17, 18, 19 and 20, respectively, then:

*Cornering force* is proportional to $(T_1+T_2)-(T_3+T_4)$ and self-aligning torque is proportional to $$(T_1+T_3)-(T_2+T_4)$$

Both cornering force and self-aligning torque are measured by connecting the appropriate strain gauge elements in separate A.C. bridge networks, 137, 138 (see FIGURE 11) with the elements arranged respectively in the arms of the bridges to obtain outputs proportional to cornering force and self-aligning torque. The bridges 137, 138 are fed with a 2 kilocycles/second 17.5 volts supply from an oscillator 139. The outputs from the bridges 137 and 138 are amplified in strain gauge signal amplifiers 140 and 141 respectively, and are then passed through phase-sensitive rectifiers 142 and 143, respectively to meters 144 and 145 respectively. A switch (not shown) is provided, to be automatically operated on reversal of the direction of rotation of the wheel carrying a tyre under test to reverse the polarity of the voltage output from the strain gauge signal amplifier 140, associated with the cornering force measurement.

In order to grade tyres it has been found desirable to combine the instantaneous values of cornering force and self-aligning torque according to the following equation:

Steering Pull=Cornering Force—K(Self-Aligning Torque)

where K is a constant for a given size of tyre deflected to a given extent.

"Steering Pull" as defined by the above equation, is thus the quantity which must be measured, and its measurement is made by combining the outputs from the phase-sensitive rectifiers 142 and 143, in a computor 146.

The computor 146 (see FIGURE 12) comprises an additive stage 147 into which the outputs representing cornering force and self-aligning torque from the phase-sensitive rectifiers 142 and 143 respectively, are fed, the output from the channel for measuring the self-aligning torque being fed via an amplifier 148, which reverses the phase of the signal fed to it, and a potentiometer 149, to the stage 147. The potentiometer 149 is contained within the multiple potentiometer unit referred to above, the constant K for the tyre under test being introduced automatically by the setting of the sliding contact 150 on this potentiomeer by the pinion 125 and rack 123 described above. The additive stage 147 comprises a pair of cathode followers 151 and 152 the cathodes of which are coupled by equal resistances 153 and 154, and the output, proportional to "Steering Pull," is taken from the junction between the resistances 153 and 154. The output from the stage 147 is fed via an amplifier 155 and a cathode follower 156 to a Steering Pull analyser 157.

The analyser 157 (see FIGURE 13) is used since it has further been found to be desirable to grade tyres in terms of the mean of the maximum and minimum values of the steering pull during a revolution of the tyre and also in terms of the range of variation in the values, i.e. the difference between the maximum and minimum values of steering pull during a revolution of the tyre.

In order to obtain the above range of variation of the values of the steering pull, the output from the computor 146 is connected to a pair of parallel amplifiers 158 and 159. The amplifier 158 comprises, on its input side, a rectifier 160 feeding a condenser 161 connected between the input to the amplifier 158 and earth. Similarly, a rectifier 162 and condenser 163 are provided on the input side of the amplifier 159, the rectifiers 160 and 162 being oppositely connected with respect to one another. Switches 164 and 165 are provided in the input circuits for connecting short circuits across the rectifiers 160, 162 during part of the testing cycle to re-set the condensers 161 and 163 to an equal potential. The outputs from the amplifiers 158 and 159 are fed to cathode follower circuits 166 and 167 respectively, a meter 168 being connected betwten the output sides of the circuits 166 and 167. The meter 168 registers the difference between the outputs from the circuits 166 and 167. When the apparatus is operated in the manner to be described, the outputs from the cathode follower circuits 166 and 167 provide a measure of the maximum and minimum peak values of the steering pull and the meter 168 thus registers the range of variation of the steering pull.

To obtain the mean of the maximum and minimum values of steering pull, the two outputs of the amplifiers 158 and 159 are connected by equal resistances 169, 170, the voltage from the junction of the resistances 169, 170 representing the mean value. A cathode follower 171 and meter 172 are provided to measure this value.

A limit amplifier circuit 173 is provided having different relays (not shown) to be operated when the mean value of steering pull reaches different predetermined levels. The input to the amplifier 173 is taken from the output of the circuit 171 and the levels at which the relays contained in the amplifier 173 are operated are adjustable by a variable potentiometer (not shown) forming part of the multiple potentiometer unit, which is adjusted for a particular tyre by the cam shaft 112. The relay contacts are each connected to supply current to one of a set of indicator lamps 174 to indicate the grading of the tyre under test.

The output from the circuit for measuring the range of variation between the maximum and minimum values of the steering pull is also connected via relays contained in a limit amplifier 175 to the same set of indicator lamps 174, the levels at which the amplifier 175 operates its relays also being controlled by the setting of a potentiometer (not shown) forming part of the multiple potentiometer unit (not shown). The relays of the circuits 173 and 175 are arranged so that the final grading of the tyre being tested is determined by a combination of the mean and range of variation values of steering pull.

The measurement of vertical load is obtained from the vertical tension links 13–16. The strain gauges attached to these links are arranged additively in a conventional bridge circuit 176 fed with a 2 kilocycles second 35 volts supply from the oscillator 139, and the birdge output is fed via an amplifier 177 and a phase-sensitive rectifier 178 to a voltmeter 179 calibrated to give a measure of the total vertical load. The output from the phase-sensitive rectifier 178 is also fed to an analyser 180, similar to the steering pull analyser 157, for measuring the maximum and minimum peak levels of the vertical load and computing their difference, or range of fluctuation, during one revolution of the tyre. A voltage representing this difference is fed from the analyser 180 to a limit amplifier 181 which contains a relay, (not shown), to be operated if the range of fluctuation in load reaches or exceeds a predetermined level. The relay contacts are arranged to close a circuit which lights an indicator lamp 182 when the predetermined fluctuation range has been exceeded. The permissible fluctuation range is dependent on the size of tyre being tested, and the multiple potentiometer unit mentioned above, operated by the camshaft 112, sets the limits appropriate to the tyre under test.

The operation of the tyre testing apparatus will now be described.

During the preliminary setting-up operations the cradle 2 carrying the drum 1 is held rigidly with respect to the frame by the magnetic clamps 74.

The tyre to be tested (not shown) is mounted on the specially designed wheel 108 supported on the supply turret 92 and inflated to its normal operating pressure. The slide 83 carrying the axle 89 is brought into its fully raised position and the cam shaft 112 is set for the size of tyre to be tested by means of the handwheel 112a, the sleeve 91 surrounding the axle being retracted by automatic actuation of the associated piston and cylinder 98 whilst the camshaft is rotated. When the setting of the camshaft 112 is completed the sleeve 91 is advanced until one of the shoulders 119 formed on the member 118 attached to the sleeve 91 engages with the plunger 120, thus setting the axial position of the sleeve 91 and that of the hub 90 relative to the drum.

The test is then initiated by the operation of a switch and the rest of the operations take place in a controlled sequence as follows.

The automatic transfer of the tyre and wheel 108 to the hub 90 takes place by advancing the axle 89 by pneumatic pressure applied at the left-hand side of the piston 93 (see FIGURE 9) until the hub engages with the centre of the wheel 108. The wedges 109 are operated to grip the wheel, and the axle is then retracted until the portion 97 of the axle engages with its conical seating 96 in the sleeve, the hub 90 then being in the axial position relative to the drum, set by the camshaft 112, appropriate to hold the tyre being tested with its mid-circumferential plane passing through that diagonal of the square formed by the lines of action of the tension links 17–20 which is perpendicular to the drum axis.

The slide 83 is lowered by the action of the pneumatic cylinder and piston 85 to bring the tyre into loaded contact with the drum 1, the tyre being deflected by an amount set by the engagement of the radial stud 114 selected on the cam 113 with the fixed stop 115 on the machine frame 12.

The magnetic clamps 74 holding the cradle 2 are now released and the motor (not shown) for driving the tyre is started. The motor, the speed of which is controlled electronically, drives the tyre, at a speed such that the drum 1 rotates at 6 revolutions per minute, for two revolutions in one direction and then for two revolutions in the opposite direction.

The inputs to the strain gauge signal amplifiers 140, 141 and 177 are short-circuited during the first revolution of the tyre, since the forces produced do not achieve their true values until the elements of the tyre under test adjust themselves to rolling conditions, a steady state being achieved after a single revolution. The tyre is graded according to the forces produced in the second revolution, which have been found to give reliable results.

Immediately before the second revolution of the tyre, the short circuits on the inputs of the strain gauge signal amplifiers 140, 141 and 177 are removed and the rectifiers 160 and 162 in the steering pull analyser are momentarily short-circuited by the switches 164 and 165 respectively. The condensers 161 and 163 fed by the rectifiers 160 and 162 respectively are thus put into an uncharged state, ready to be charged, one to a voltage corresponding to the maximum value, and the other to a voltage corresponding to the minimum value of the steering pull during the second revolution.

The maximum and minimum voltages produced in the amplifiers 158 and 159 during the second revolution are fed to the circuits 169–171 and 166, 167 for computing, respectively, their mean values and the difference between their values. Voltages representing these values are then fed to the limit amplifiers 173 and 175, which operate the appropriate relays for illuminating the set of grading lamps 174, but these lamps are not connected in the circuit until two further revolutions have been made. The third and fourth revolutions take place in the opposite direction to the first and second revolutions, the states of switching of the electrical circuits during the third and fourth revolutions corresponding respectively to the states of switching of the circuits during the first and second forward revolutions, except that the voltage output from the strain gauge signal amplifier 140 is automatically reversed in polarity to take account of the fact that the direction of cornering forces produced in the third and fourth revolutions of the tyre is opposite to that of the forces produced in the first and second revolutions.

If the steering pull produced by the tyre during the fourth revolution is greater, or shows greater range of variation, than in the second revolution, the setting of the relays operated by the limit amplifiers 173, 175 may alter to grade the tyre according to the values obtained during the fourth revolution.

After the fourth revolution, the grading lamps 174 are connected in circuit with the relay contacts to indicate the grade of the tyre tested.

The apparatus described above is almost entirely automatic in operation. A simpler machine according to the invention, which needs more manual labour in operation, but which has been found to give satisfactory results, is constructed as follows (see FIGURES 15 and 16):

A drivable axle 183, having a hub 184 for mounting a wheel (not shown) carrying a tyre 185 to be tested, is rotatably supported in bearings (not shown) attached to a rigid rectangular frame 186. The rectangular frame 186 is pivotally supported at one side 186a by a pair of hinges 187 (only one which is shown in FIGURE 15) attached to a machine frame 188, the axle being parallel to the pivotal axis of the pivots 187. An electric motor (not shown) is provided for driving the axle 183.

A pair of screwed rods 189, only one of which is shown in FIGURE 15, is provided for adjusting the height of the axle 183 relative to the machine frame 188. Each rod 189 is pivotally attached to the machine frame 188 by a pivoted block 189a and passes through a clearance hole in a block 190 pivotally attached to the side 186b of the rectangular frame 186. The blocks 190 are carried by pairs of pivots 191 rigidly attached to the side 186b of the rectangular frame, the pivotal axes of the blocks 189a and 190 being parallel to the pivotal axis of the frame 186. A pair of nuts 192 is provided on each screwed rod 189, one nut for engaging the upper surface of the screwed block 190, and the other (not shown) for engaging the lower surface of the block. By adjusting the positions of the nuts 192 on the screwed rods 189, the height of the axle 183 above the machine frame 188 can be set to a predetermined value according to the size of tyre to be tested.

Rigidly attached to the machine frame 188, in a position to be vertically below a wheel carried by the wheel hub is a rotatable drum 193, supported by a pair of bearings 194 (only one of which is shown in FIGURE 16) in a cradle 195 and linked to the frame by a system of horizontal tension links 196, 197, 198 and 199 and vertical tension links 200, 201, 202, 203, all the links being provided with strain gauges and being arranged in a manner similar to that described for the first embodiment. The axis of the drum 193 is aligned parallel with that of the axle 183 for supporting the tyre to be tested. Any change in the position of the drum axis resulting from cornering force, self-aligning torque or variations in vertical load developed by rotation of the tyre under test in contact with the drum is detected by the strain gauge system as in the first embodiment.

The outputs from the strain gauge systems representing cornering force, self-aligning torque, and vertical load, may, as in the previous embodiment, be fed to electronic circuits as described above for automatically grading the tyre under test according to the values of steering pull and vertical load variations produced during a test. Alternatively, the strain gauge system may be coupled via an amplifier for each quantity to be measured to separate recorders for cornering force, self-aligning torque, and vertical load. In this instance, grading of the tyre under test is determined by graphical estimation of the steering pull.

In a further alternative form of the apparatus according to the invention, the cradle carrying the rotatable drum as incorporated in either of the embodiments described, is supported against vertical forces by a hydraulic load-measuring capsule, the capsule preferably being provided with strain gauges for producing an electrical signal corresponding to the hydraulic pressure produced in the capsule by the load.

An alternative method of testing a pneumatic tyre by the use of apparatus according to the invention comprises forcing the tyre into contact with the drum until the vertical load reaches a predetermined value. The tyre may conveniently be forced vertically downwardly by a vertical lead screw acting on an axle carrying the wheel and tyre and driven by an electric motor which is stopped automatically when the desired load is reached. The axle is then locked in this position and the test is performed in the manner described above.

The apparatus according to the invention provides a quick and accurate means for checking the value of residual cornering force which may be present in a tyre and where this is due to errors in manufacture, the manufacture of the tyres can be controlled to produce a tyre in which there is no residual cornering force present.

Having now described our invention, what we claim is:

1. Apparatus for selectively measuring the cornering force, the self-aligning torque and both the cornering force and the self-aligning torque set up by a rotating pneumatic tyre which apparatus comprises a frame, a cylindrical drum, means for supporting said drum rotatably in fixed vertical position relative to said frame, strain sustaining and measuring means connected between said frame and said drum supporting means and disposed on lines of action about the area of contact of said tyre and said drum, means for supporting a tyre rotatably with its axis substantially parallel to the axis of said drum, means for moving said tyre supporting means relatively to said drum to bring the periphery of said drum into and out of contact with the periphery of said drum and for loading the tyre, driving means to rotate said tyre and drum in rolling contact, and means connected to and responsive to strains set up in said strain sustaining and measuring means to transform strains set up in said strain sustaining and measuring means by cornering forces and self-aligning torque forces into measurements of at least one of said forces and of stearing pull derived therefrom.

2. The apparatus of claim 1 in which said means for supporting said drum comprises a cradle, and in which said strain supporting and measuring means comprises links having a high stiffness and each being provided with a strain gauge to measure the strain set up in the link by the cornering force and the self-aligning torque set up in the drum by rotation of the tyre in contact with the drum.

3. Apparatus according to claim 2 wherein the system of links comprises at least three tension links arranged in the same horizontal plane, their lines of action forming a closed polygon around the area of contact of the tyre and the drum.

4. Apparatus according to claim 1 comprising an axle on which said drum is mounted, a cradle carrying said axle and in which said strain sustaining and measuring means comprises four tyre load measuring, vertically disposed, tension links between said cradle and said frame to suspend said cradle from said frame and four cornering force and self-aligning torque measuring horizontally disposed tension links, each link being attached at one of its ends to the frame and at the other end to the cradle, the horizontally disposed links being arranged symmetrically so that their lines of action form the sides of a square lying in a horizontal plane perpendicular to the plane containing the axes of rotation of the drum and the wheel and passing through that area of the drum which is contacted by a loaded tyre.

5. Apparatus according to claim 4 wherein the horizontally disposed tension links are arranged so that a diagonal of the square formed by the lines of action of the horizontal links lies in the plane containing the axes of the tyre and of the drum.

6. Apparatus according to claim 4 wherein the frame is made of one material of different coefficient of expansion and a plate made of material having substantially the same co-efficient of expansion as the material of said frame, the horizontal links being attached to said plate a bolt pinning said plate to said cradle, said cradle having an abutment spaced from said bolt, and means biasing said plate to said abutment to permit relative expansion between the cradle and the plate but to provide a steady mounting for the cradle.

7. Apparatus according to claim 4 wherein the means for measuring the cornering force or the self-aligning torque or both set up on the drum by rotation of the tyre in contact with the drum comprises an electrical resistance strain gauge attached to each link.

8. Apparatus according to claim 4 wherein each of the vertically disposed tension links is provided with an electrical resistance strain gauge.

9. Apparatus according to claim 4 wherein means are provided for adjusting the length of, and applying tension to, each horizontal tension link.

10. Apparatus according to claim 4 wherein means are provided for adjusting the length of each vertical link.

11. Apparatus according to claim 1 wherein the supporting means for rotatably supporting the tyre, mounted on a wheel, comprises a rotatable axle provided with a hub for supporting the wheel, a vertically movable slide mounting said axle and means being provided for moving the slide to bring the tyre and drum into and out of contact with one another and for loading the tyre.

12. Apparatus according to claim 11 comprising an adjustable stop for setting the axle at a predetermined height relative to the drum.

13. Apparatus according to claim 11 comprising a sleeve carried by the slide within which the axle is axially slidable, and an adjustable stop for setting the axle in a predetermined axial position.

14. Apparatus according to claim 13 comprising a pair of cams rotatably mounted on said slide to adjust the positions of said stop for setting the axle at a predetermined height relative to the drum and said stop for setting the axle in a predetermined axial position.

15. Apparatus according to claim 11 wherein the hub is provided with means for gripping the wheel, said means comprising a plurality of gripping members movable radially so as to engage a recess in the wheel or to be disengaged therefrom.

16. Apparatus according to claim 2 wherein the strain gauges attached to the tension links are electrical and which comprises a pair of bridge circuits connected to said strain gauges so that the outputs from the bridge circuits are proportional to the cornering force and the self-aligning torque, respectively, developed by rotation of the tyre in loaded contact with the drum.

17. Apparatus according to claim 16 wherein the bridge circuits are supplied with alternating current and which comprises phase sensitive detectors connected to the bridge circuits to receive the outputs therefrom.

18. Apparatus according to claim 16 comprising a computor connected to said bridge circuits to receive the outputs therefrom for algebraically adding said outputs and producing an output proportional to the steering pull of a tyre on said drum.

19. Apparatus according to claim 18 comprising an analyzer connected to said computor to receive the output therefrom for producing a pair of outputs proportional respectively to the mean value and range of variation of values of said steering pull for a revolution of the tyre.

20. Apparatus according to claim 19 comprising a pair of limit amplifiers connected to said analyzer to receive said outputs proportional to the mean value and range of variation of values of the steering pull for a revolution of the tyre said amplifiers being provided with relays and indicators to be actuated respectively whenever a predetermined level of mean value or range of variation of the steering pull is exceeded.

21. Apparatus according to claim 20 which comprises adjustable potentiometers in the circuit to said computor to determine the levels of mean value and range of variation of the steering pull at which the relays of said limit amplifiers are operated.

References Cited in the file of this patent

UNITED STATES PATENTS

| | | |
|---|---|---|
| 1,598,009 | Prather | Aug. 31, 1926 |
| 2,598,599 | Pleasance | May 27, 1952 |
| 2,695,520 | Karsai | Nov. 30, 1954 |